(12) United States Patent
Yan et al.

(10) Patent No.: US 12,380,612 B2
(45) Date of Patent: Aug. 5, 2025

(54) METHOD, APPARATUS, AND DEVICE FOR PROCESSING IMAGES, AND STORAGE MEDIUM

(71) Applicant: OUR UNITED CORPORATION, Xi'an (CN)

(72) Inventors: Hao Yan, Xi'an (CN); Jinsheng Li, Xi'an (CN)

(73) Assignee: OUR UNITED CORPORATION, Xi'an (CN)

( * ) Notice: Subject to any disclaimer, the term of this patent is extended or adjusted under 35 U.S.C. 154(b) by 316 days.

(21) Appl. No.: 17/936,043

(22) Filed: Sep. 28, 2022

(65) Prior Publication Data

US 2023/0094102 A1 Mar. 30, 2023

(30) Foreign Application Priority Data

Sep. 28, 2021 (CN) .......................... 202111142302.9

(51) Int. Cl.
*G06T 11/00* (2006.01)
*G06T 7/30* (2017.01)

(52) U.S. Cl.
CPC ............. *G06T 11/008* (2013.01); *G06T 7/30* (2017.01); *G06T 2210/52* (2013.01); *G06T 2211/424* (2013.01)

(58) Field of Classification Search
None
See application file for complete search history.

(56) References Cited

U.S. PATENT DOCUMENTS

| 2013/0034286 | A1  | 2/2013 | Vija |
|---|---|---|---|
| 2017/0178317 | A1* | 6/2017 | Besley ...................... G06T 5/80 |
| 2022/0005239 | A1* | 1/2022 | Bontus .................. G06T 11/006 |

FOREIGN PATENT DOCUMENTS

| CN | 103054600 A | 4/2013 |
|---|---|---|
| CN | 103180879 A | 6/2013 |
| CN | 110084866 A | 8/2019 |
| CN | 110730977 A | 1/2020 |
| CN | 113039581 A | 6/2021 |

* cited by examiner

*Primary Examiner* — Tapas Mazumder
(74) *Attorney, Agent, or Firm* — Kolitch Romano Dascenzo Gates LLC

(57) ABSTRACT

Provided is a method for processing images. In the method, upon acquiring projection data of an object to be detected, a parsed image is acquired by performing parsing reconstruction on the projection data by calling a first image processing unit. Then a first registered image is acquired by registering the parsed image and a reference image by calling a second image processing unit, and an iterated image is acquired by performing iterative reconstruction on the projection data by calling the first image processing unit.

18 Claims, 3 Drawing Sheets

METHOD, APPARATUS, AND DEVICE FOR PROCESSING IMAGES, AND STORAGE MEDIUM

CROSS-REFERENCE TO RELATED APPLICATION

The present disclosure is based on and claims priority of the Chinese Patent Application No. 202111142302.9, filed on Sep. 28, 2021 and entitled "METHOD, APPARATUS AND DEVICE FOR PROCESSING IMAGES", the disclosure of which is herein incorporated by reference in its entirety.

TECHNICAL FIELD

The present disclosure relates to the field of image processing technologies, and more particularly to a method, apparatus, and device for processing images, and a storage medium.

BACKGROUND

Applications of computed tomography (CT) scanning imaging technologies in c medicine is one of important signs of medical technology progress in the $20^{th}$ century.

With development of science and technology, CT scanning manners change greatly, and cone beam CT (CBCT) has been practically applied. CBCT uses a cone beam projection computed reconstructed tomography imaging device, and the principle is that an X-ray generator annularly and digitally projects around a projected object at a low amount of a ray. A three-dimensional image is acquired by reconstructing data obtained by multiple digital projection around the projected object.

SUMMARY

Embodiments of the present disclosure provide a method, apparatus, and device for processing images, and a storage medium. The embodiments of the present disclosure are implemented by the following.

According to some embodiments of the present disclosure, a method for processing images is provided. The method is applicable to a device for processing images including a first image processing unit and a second image processing unit. The method includes:
acquiring projection data of an object to be detected;
acquiring a parsed image by performing parsing reconstruction on the projection data by calling the first image processing unit; and
acquiring a first registered image by registering the parsed image and a reference image by calling the second image processing unit, and acquiring an iterated image by performing iterative reconstruction on the projection data by calling the first image processing unit object to be detected;
wherein a process of iterative reconstruction and a process of registration are performed in parallel.

In some embodiments, the device for processing the images further includes an image displaying unit, and acquiring the first registered image by registering the parsed image and the reference image by calling the second image processing unit includes:
displaying first prompt information on the image displaying unit, wherein the first prompt information includes a parsing reconstruction completion prompt and/or a first registration prompt; and
acquiring the first registered image by registering the parsed image and the reference image by calling the second image processing unit in response to a registration instruction sent based on the first prompt information.

In some embodiments, the device for processing the images further includes an image displaying unit, and upon acquiring the first registered image by registering the parsed image and the reference image by calling the second image processing unit, the method further includes:
displaying the first registered image on the image displaying unit.

In some embodiments, the device for processing the images further includes an image displaying unit, and upon performing iterative reconstruction on the projection data by calling the first image processing unit, the method further includes:
acquiring progress data of iterative reconstruction on the projection data; and
parsing the progress data, and visually displaying parsed progress data on the image displaying unit.

In some embodiments, upon acquiring the iterated image by performing iterative reconstruction on the projection data by calling the first image processing unit, the method further includes:
acquiring a second registered image by registering at least two of the iterated image, the parsed image, and the reference image by calling the second image processing unit.

In some embodiments, the device for processing the images further includes an image displaying unit, and acquiring the second registered image by registering at least two of the iterated image, the parsed image, and the reference image by calling the second image processing unit includes:
displaying a second prompt information on the image displaying unit, wherein the second prompt information includes an iterative reconstruction completion prompt and/or a second registration prompt; and
acquiring the second registered image by registering the at least two of the iterated image, the parsed image, and the reference image by calling the second image processing unit in response to a registration instruction sent based on the second prompt information.

In some embodiments, the device for processing the images further includes an image displaying unit, and upon acquiring the iterated image by performing iterative reconstruction on the projection data by calling the first image processing unit, the method further includes:
displaying the second registered image on the image displaying unit.

In some embodiments, the device for processing the images further includes an image displaying unit, and upon acquiring the iterated image by performing iterative reconstruction on the projection data by calling the first image processing unit, the method further includes:
selecting a first region image from the iterated image and a second region image from the parsed image based on image parameters of the iterated image and the parsed image;
acquiring a target image by combining the first region image and the second region image; and
displaying the target image on the image displaying unit.

In some embodiments, upon acquiring the target image by combining the fiat region image and the second region image, the method further includes:
　　displaying at least two of the target image, the parsed image, the iterated image, and the reference image on the image displaying unit in an overlaid fashion.

According to some embodiments of the present disclosure, an apparatus for processing images is provided. The apparatus is applicable to a device for processing images including a first image processing unit and a second image processing unit. The apparatus includes: a processor, a memory, and one or more computer programs stored on the memory and runnable on the processor, wherein the one or more computer programs, when loaded and run by the processor, cause the processor to perform:
　　acquiring projection data of an object to be detected;
　　acquiring a parsed image by performing parsing reconstruction the projection data by calling the first image processing unit; and
　　acquiring a first registered image by registering the parsed image and a reference image by calling the second image processing unit, and acquiring an iterated image by performing iterative reconstruction on the projection data by calling the first image processing unit;
　　wherein a process of iterative reconstruction and a process of registration are performed in parallel.

In some embodiments, the device for processing the images further includes an image displaying unit, and acquiring the first registered image by registering the parsed image and the reference image by calling the second image processing unit includes:
　　displaying first prompt information on the image displaying unit, wherein the first prompt information includes a parsing reconstruction completion prompt and/or a first registration prompt; and
　　acquiring the first registered image by registering the parsed image and the reference image by calling the second image processing unit in response to a registration instruction sent based on the first prompt information.

In some embodiments, the device for processing the images further includes an image displaying unit, and upon acquiring the first registered image by registering the parsed image and the reference image by calling the second image processing unit, the one or more computer programs further cause the processor to perform:
　　displaying the first registered image on the image displaying unit.

In some embodiments, the device for processing the images further includes an image displaying unit, and upon performing parsing reconstruction on the projection data by calling the first image processing unit, the one or more computer programs further cause the processor to perform:
　　acquiring progress data of iterative reconstruction on the projection data; and
　　parsing the progress data, and visually displaying parsed progress data on the image displaying unit.

In some embodiments, upon acquiring the iterated image by performing iterative reconstruction on the projection data by calling the first image processing unit, the one or more computer programs further cause the processor to perform:
　　acquiring a second registered image by registering at least two of the iterated image, the parsed image, and the reference image by calling the second image processing unit.

In sonic embodiments, the device for processing the images further includes an image displaying unit, and acquiring the second registered image by registering at least two of the iterated image, the parsed image, and the reference image by calling the second image processing unit includes:
　　displaying a second prompt information on the image displaying unit, wherein the second prompt information includes an iterative reconstruction completion prompt and/or a second registration prompt; and
　　acquiring the second registered image by registering the at least two of the iterated image, the parsed image, and the reference image by calling the second image processing unit in response to a registration instruction sent based on the second prompt information.

In some embodiments, the device for processing the images further includes an image displaying unit, and upon acquiring the iterated image by performing iterative reconstruction on the projection data by calling the first image processing unit, the one or more computer programs further cause the processor to perform:
　　displaying the second registered image on the image displaying unit.

In some embodiments, the device for processing the images further includes an image displaying unit, and upon acquiring the iterated image by performing iterative reconstruction on the projection data by calling the first image processing unit, the one or more computer programs further cause the processor to perform:
　　selecting a first region image from the iterated image and a second region image from the parsed image based on image parameters of the iterated image and the parsed image;
　　acquiring a target image by combining the first region image and the second region image; and
　　displaying the target image on the image displaying unit.

In some embodiments, upon acquiring the target image by combining the first region image and the second region image, the one or more computer programs further cause the processor to perform:
　　displaying at least two of the target image, the parsed image, the iterated image, and the reference image on the image displaying unit in an overlaid fashion.

According to some embodiments of the present disclosure, a device for processing images is provided. The device includes a first image processing unit, a second image processing unit, a memory, a processor, and one or more computer programs stored on the memory and runnable on the processor. The processor, when loading and executing the one or more computer programs, is caused to perform the method in above embodiments by calling the first image processing unit and the second image processing unit.

According to some embodiments of the present disclosure, a readable storage medium is provided. The readable storage medium includes one or more computer programs. Wherein the one or more computer programs, when loaded and run, cause an electronic device of the readable storage medium to perform the method in above embodiments.

BRIEF DESCRIPTION OF THE DRAWINGS

The technical solutions and other beneficial effects of the present disclosure will be made apparent by the following detailed descriptions of the specific embodiments of the present disclosure with reference to the accompanying drawings.

Figure 1:
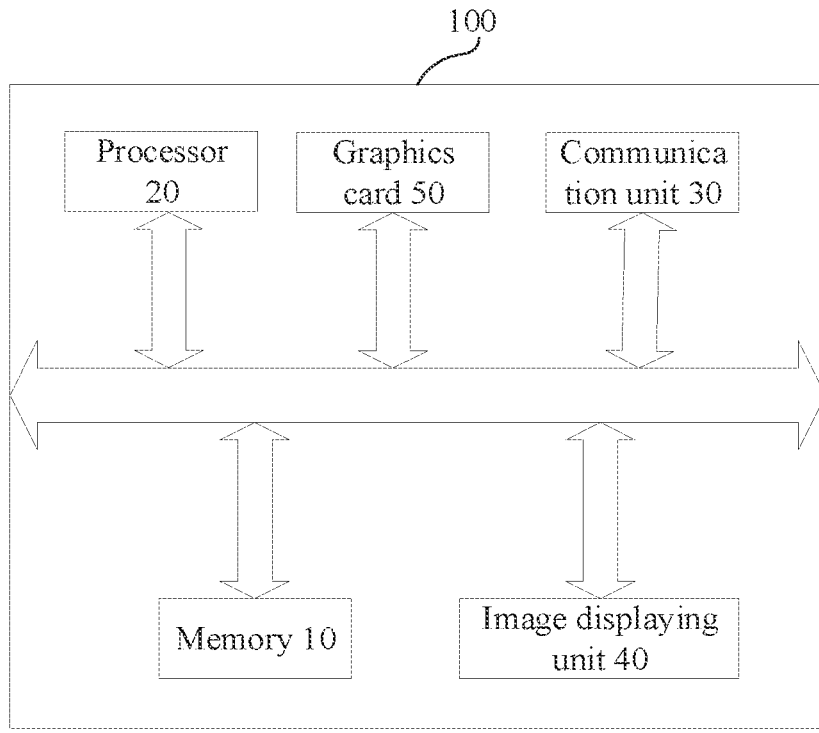
FIG. 1 is a schematic structural diagram of a device for processing images according to some embodiments of the present disclosure.

Reference numerals: 100-device for processing images; 10-memory; 20-processor; 30-communication unit; 40-image displaying unit; 50-graphics card; 60-apparatus for processing images; 61-data acquiring module; 62-first processing module; and 63-second processing module.

DETAILED DESCRIPTION

The technical solutions in the embodiments of the present disclosure are described clearly and completely hereinafter in conjunction with the accompanying drawings in the embodiments of the present disclosure. Apparently, the described embodiments are only a part of embodiments of the present disclosure, not all embodiments of the present disclosure. All other embodiments achieved by persons skilled in the art based on the embodiments of the present disclosure without creative work shall fall within the scope of protection the present disclosure.

In the description of the present disclosure, it should be understood that directional or positional relationships shown by the terms such as "center," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial," and "circumferential" are directional or positional relationships based on the accompanying drawings, which only intend to facilitate description of the present disclosure and simplify the description, but do not indicate or imply that the apparatuses or components must have specific directions, or be constructed or operated in the specific directions, and thus are not limitative of the present disclosure. In addition, the terms "first" and "second" are only for the purpose of description and should not be understood as indicating or implying relative importance or implicitly indicating the number of indicated technical features. Thus, features defined by the terms "first" and "second" may explicitly or implicitly include one or more features. In the description of the present disclosure, the term "a plurality of" means two or more, unless otherwise specifically limited.

In the description of the present disclosure, it should be noted that, unless otherwise definitely specified and limited, the terms "mounted," "connected," and "connection" need to be broadly understood, for example, fixed connection, detachable connection, or integrated connection; or mechanical connection or electric connection; or direct connection, or indirect connection via an intermediate medium, or communication of inner parts of two elements, or interaction relationship of two parts. A person of ordinary skill in the art can understand the specific meaning of the above terms in the present disclosure in accordance with specific conditions.

In the present disclosure, unless otherwise definitely specified and limited, the first feature "above" or "below" the second feature may mean that the first feature is in direct contact with the second feature, or indirectly in contact with the second feature via an intermediate medium. Moreover, the first feature "over," "above, on" the second feature may mean that the first feature is provided directly above, or above and staggered from the second feature, or merely means that a level of the first feature is higher than that of the second feature. The first feature "under," "below," or "beneath" the second feature may mean that the first feature is provided directly below, or below and staggered from the second feature, or merely mean that a level of the first feature is lower than that of the second feature.

The following disclosure provides many different embodiments or examples for implementing different structures of the present disclosure. To simplify the disclosure of the present disclosure, components and settings of specific examples are described hereinafter. They are examples only and are not intended to limit the present disclosure. Furthermore, reference numerals and/or reference letters may be repeated in different examples of the present disclosure, and the repetition is for the purpose of simplicity and clarity and is not indicative of a relationship between the various embodiments and/or settings discussed. In addition, the present disclosure provides examples of various specific processes and materials, but those of ordinary skill in the art may be aware of the use of other processes and/or the use of other materials.

As described in the BACKGROUND, parsing reconstruction and iterative reconstruction are mostly used for the reconstruction of CBCT. Compared with art image acquired by parsing reconstruction, an image acquired by iterative reconstruction is of greater quality. However, for the iterative reconstruction, it is necessary to put all projection data of an object to be detected into the algorithm for processing. The parsing reconstruction and the collection of the projection data of the object to be detected are performed simultaneously. That is, for the reconstruction of CBCT, the iterative reconstruction needs to be performed after parsing reconstruction. In the case that the image acquired by parsing reconstruction needs to be registered, the process of registration may not be started until the iterative reconstruction is completed, such that the process is time-consumed and has low efficiency. In the case that the iterative reconstruction and registration are performed simultaneously, more computing resources are required, and thus the computation is mutually affected.

Accordingly, the embodiments of the present disclosure provide a method, apparatus and device for processing images. After projection data of an object to be detected is acquired, a parsed image is acquired by performing parsing reconstruction on the projection data of the object to be detected by calling a first image processing unit. Then, an iterated image is acquired by registering the parsed image and a reference image by calling a second image processing unit, and by performing iterative reconstruction on the projection data of the object to be detected by calling the first image processing unit. In this way, by providing the first image processing unit and the second image processing unit, iterative reconstruction on the projection data by the first image processing unit and registration on the parsed image and the reference image by the second image processing unit are performed in parallel after parsing reconstruction, that is, the process of registration and the process of iterative reconstruction are performed in parallel, such that the time is saved and the efficiency is improved. In addition, the resource demands for parallel processes of registration and iterative reconstruction are met.

Referring to FIG. 1, FIG. 1 is a schematic block diagram of a device for processing images according to some embodiments of the present disclosure. As shown in FIG. 1, the device 100 for processing the images includes a memory 10, a processor 20, a communication unit 30, an image displaying unit 40, and at least two graphics cards 50, with only one graphics card 50 shown schematically in FIG. 1. The memory 10, the processor 20, the communication unit 30, the image displaying unit 40, and the graphics card 50 are directly or indirectly in electrical connection to realize signal transmission or interaction. For example, these components are electrically connected via at least one communication bus or signal line.

In the embodiments of the present disclosure, the at least two graphics cards 50 include a first graphics card and a second graphics card. The first graphics card is configured for reconstruction of the images, such as iterative reconstruction and parsing reconstruction of the images. The second graphics card is configured for registration of the images, such as registration of an iterated image and registration of a parsed image.

In the embodiments of the present disclosure, the memory 10 stores a machine-readable instruction executable by the processor 20. In the case that the device 100 for processing the images is in operation, the processor 20 and the memory 10 communicate with each other via a bus, and the processor 20 executes the machine-readable instruction and performs a method for processing images.

In some embodiments, the memory 10 is, but is not limited to, a random access memory (RAM), a read only memory (ROM), a programmable read-only memory (PROM), an erasable programmable read-only memory (EPROM), an electrical erasable programmable read-only memory (EEPROM), or the like.

In some embodiments, the processor 20 is configured to execute one or more of the functions described in the embodiments of the present disclosure. In some embodiments, the processor 20 includes one or more processing cores (for example, a single-core processor or a multi-core processor).

In some embodiments, the processor 20 includes a central processing unit (CPU), an application specific integrated circuit (ASIC), an application specific instruction-set processor (ASIP), a physics processing unit (PPU), a digital signal processor (DSP), a field programmable gate array (FPGA), a programmable logic controller (PLC), a microcontroller unit (MCU), a reduced instruction set computer (RISC), and/or a microprocessor.

For the ease of description, only one processor 20 is described in the device 100 for processing the images. However, it should be noted that the device 100 for processing the images in the embodiments of the present disclosure further includes a plurality of processors 20, such that the steps performed by one processor described in the embodiments of the present disclosure may also be performed by the plurality of processors 20 jointly or independently. For example, in the case that the processor 20 of the device 100 for processing the images performs steps A and B, it should be understood that steps A and B are also performed by two different processors 20 jointly or performed independently by one processor 20. For example, in two different processors 20, one processor 20 performs step A and the other processor 20 performs step B, or the two different processors 20 perform steps A and B jointly.

In the embodiments of the present disclosure, the memory 10 is configured to store a program, and the processor 20 is configured to execute the program upon receiving an execution instruction. The method defined by the process in any one of the embodiments of the present disclosure is applicable to or performed by the processor 20.

In the embodiments of the present disclosure, the communication unit 30 is configured to establish a communication connection between the device 100 for processing the images and other devices via a network, and is also configured to send and receive data via the network.

In some embodiments, the network is any type of a wired network, a wireless network, or a combination of wired and wireless networks, For examples, the network includes a wired network, a wireless network, a fiber optic network, a telecommunication network, an intranet, art Internet, a local area network (LAN), a wide area network (WAN), a wireless local area network (WLAN), a metropolitan area network (MAN), a wide area network (WAN), a public switched telephone network (PSTN), a Bluetooth network, a ZigBee network, a near field communication (NFC) network, or any combination of above networks.

In the embodiments of the present disclosure, the image displaying unit 40 provides an interactive interface (for example, a user operation interface) between the device 100 for processing the images and a user for displaying image information. In the embodiments of the present disclosure, the image displaying unit 40 is a liquid crystal display or a touch display. In the case that the image displaying unit 40 is the touch display, the image displaying unit 40 is a capacitive touch screen or a resistive touch screen that supports single-point and multi-touch operations. The single-touch and multi-touch operations mean that a touch display is capable of sensing a touch operation from one or more positions on the touch display, and sending the sensed touch operation o the processor 20 for computing and processing.

In the embodiments of the present disclosure, to facilitate interaction between the user and the image displaying unit 40, the device 100 for processing the images also includes an input/output (I/O) unit, and the I/O unit is configured to provide the user with input data to achieve interaction between the user and the device 100 for processing the images. The I/O unit is, but is not limited to, a mouse and a keyboard.

In some embodiments, the device 100 for processing the images includes one or N image displaying units 40. N is a positive integer greater than 1.

In the embodiments of the present disclosure, the device 100 for processing the images is a physical server (for example, an image server) or a service cluster consisting of multiple physical servers, which is not specifically limited in the embodiments of the present disclosure.

In the embodiments of the present disclosure, the device 100 for processing the images is connected to a CT device, and the CT device includes components such as a ray generator and a detector. Upon the object to be detected is scanned with X rays generated by the ray generator, the detector receives the X rays passing through the object to be detected. Projection data of the object to be detected is acquired by converting the received X rays into visible light, the visible light into electrical signals via photoelectric conversion, and the electrical signals into digits by an analog/digital converter (ADC). Then, the projection data of the object to be detected is sent to the device 100 for processing the images for processing.

Upon receiving the projection data, the device 100 for processing the images acquires a parsed image by performing parsing reconstruction on the projection data of the object to be detected by calling a first image processing unit. Then, the device 100 for processing the images acquires a first registered image by registering the parsed image and a reference image by calling a second image processing unit, and acquires an iterated image by performing iterative reconstruction on the projection data of the object to be detected by calling the first image processing unit. In this way, by providing the first image processing unit and the second image processing unit, iterative reconstruction of the projection data by the first image processing unit and registration of the parsed image and the reference image by the second image processing unit are performed in parallel after parsing reconstruction, that is, the process of registration and the process of iterative reconstruction are performed in parallel, such that the time is saved, and the efficiency is improved.

It can be understood that the structure shown in FIG. 1 is for illustration only. The device 100 for processing the images also includes more or fewer components than those shown in FIG. 1, or may be of a different configuration from those shown in FIG. 1. Each component shown in FIG. 1 is performed by hardware, software or a combination thereof.

Based on the implementation architecture of FIG. 1, the embodiments of the present disclosure provide a method for processing images, which is performed by the device 100 for processing the images shown in FIG. 1, and the device 100 for processing the images includes a first image processing unit and a second image processing unit.

In the embodiments of the present disclosure, in order to meet the demand on computing resources required for parallel processes of registration and iterative reconstruction, the first image processing unit and the second image processing unit are two different graphics cards.

In some embodiments, the first image processing unit and the second image processing unit are acquired by dividing the computing resources of the same graphics card.

Figure 2:
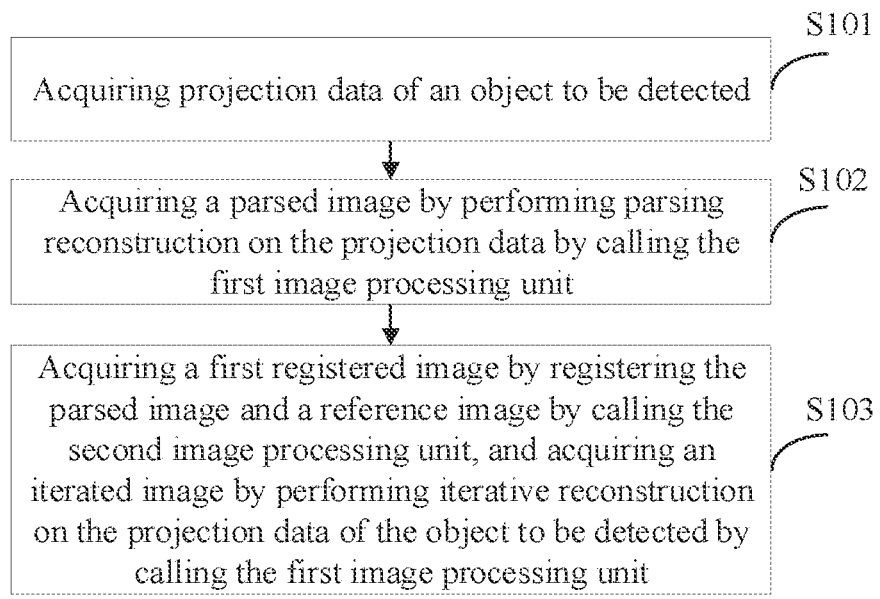
FIG. 2 is a flow chart of a method for processing images according to some embodiments of the present disclosure.

The steps of the method for processing the images according to the embodiments of the present disclosure are described in detail hereinafter. Referring to FIG. 2, the method for processing the images according to the embodiments of the present disclosure includes S101 to S103.

In S101, projection data of an object to be detected is acquired.

In the embodiments of the present disclosure, the projection data of the object to be detected is acquired by irradiating the object to be detected by a CT device.

The CT device includes a ray generator, a detector, and the like. Upon the object to be detected is scanned with X rays generated by the ray generator, the detector receives the X rays passing through the object to be detected. The projection data of the object to be detected is acquired by converting the X rays passing through the object to be detected into visible light, the visible light into electrical signals via photoelectric conversion, and the electrical signals into digital signals by an analog/digital converter (ADC). The object to be detected is a human body, a die body, or an animal, and the object to be detected is an object capable of being imaged by the CT device.

The CT device is connected to the device 100 for processing the images, and CT device sends, in response to acquiring the projection data of the object to be detected, the projection data of the object to be detected to the device 100 for processing the images for processing.

In S102, a parsed image is acquired by performing parsing reconstruction projection data by calling the first image processing unit.

An algorithm for parsing reconstruction is configured in the first image processing unit, and the device for processing the images acquires, in response to acquiring the projection data of the object to be detected, the parsed image of the object to be detected by performing parsing reconstruction on the projection data of the object to be detected by calling the first image processing unit. In the embodiments of the present disclosure, the first image processing unit performs parsing reconstruction on the projection data of the object to be detected using a filtered back projection (FBP) or FDK (Feldkamp Davis Kress) algorithm, which is specifically set according to actual needs and is not limited in the embodiments of the present disclosure.

In S103, a first registered image is acquired by registering the parsed image and a reference image by calling the second image processing unit, and an iterated image is acquired by performing iterative reconstruction on the projection data of the object to be detected by calling the first image processing unit.

The device 100 for processing the images pre-processes the projection data using the first image processing unit prior to iterative reconstruction. In some embodiments, the pre-processing is the same as the pre-processing of parsing reconstruction on the projection data. In addition, after iterative reconstruction, the device 100 for processing the images also post-processes the acquired iterated image, or post-processes the acquired parsed image by calling the first image processing unit.

Iterative reconstruction is of a large amount of computation, and thus all the projection data of the object to be detected needs to be acquired. In the process of parsing reconstruction, the construction and the collection of the projection data of the object to be detected are simultaneously performed, that is, the collection of the projection data and the process of parsing reconstruction are performed simultaneously. Therefore, all the projection data of the object to be detected is collected in the case that parsing reconstruction is completed.

Accordingly, in the embodiments of the present disclosure, after the device 100 for processing the images acquires the parsed image by performing parsing reconstruction on the projection data of the object to be detected by the first image processing unit, the first image processing unit saves all the projection data of the object to be detected.

In order to improve the efficiency and save the waiting time, in the embodiments of the present disclosure, in response to acquiring the parsed image, the device 100 for processing the images acquires the first registered image by registering the parsed image and the reference image by calling the second image processing unit, and acquires the iterated image by performing iterative reconstruction on the projection data of the object to be detected by calling the first image processing unit. In this way, the first image processing unit and the second image processing unit operate in parallel, and the process of iterative reconstruction and the process of registration are performed in parallel. That is, the parsed image is registered in the process of iterative reconstruction, such that the waiting time of the user is saved.

In the embodiments of the present disclosure, the reference image for registration is preset in the second image processing unit, in the case that the device 100 for processing images registers the parsed image by calling the second image processing unit, the second image processing unit registers the reference image and the parsed image.

In the case that the second image processing unit registers the reference image and the parsed image, an appropriate transformation model is selected as required. Then, feature points of the reference image and the parsed image are acquired by performing feature extraction on the reference image and the parsed image. Afterwards, the feature points of the reference image and the parsed image are matched. After that, the parameter range of the transformation model is determined based on the matched feature points, and the maximum relevant points are searched by a search space based on an optimization criterion using an optimal search strategy and the similarity measure, such that unknown parameters in the transformation model are acquired. Finally, images to be registered are mapped to the reference image according to the transformation model to achieve the match between the images.

In the embodiments of the present disclosure, the first image processing unit performs iterative reconstruction on the projection data of the object to be detected using an algebraic iterative reconstruction algorithm or statistical iterative reconstruction algorithm, which is set according to actual needs and is not limited in the embodiments of the present disclosure.

In the method for the processing the images according to the embodiments of the present disclosure, after the projection data of the object to be detected is acquired, the parsed image is acquired by performing parsing reconstruction on the projection data of the object to be detected by calling the first image processing unit. Then, the first registered image is acquired by registering the parsed image and the reference image by calling the second image processing unit, and the iterated image is acquired by performing iterative reconstruction on the projection data of the object to be detected by calling the first image processing unit. In this way, by providing the first image processing unit and the second image processing unit, iterative reconstruction on the projection data by the first image processing unit and registration on the parsed image and the reference image by the second image processing unit are performed in parallel after parsing reconstruction, that is, the process of registration and the process of iterative reconstruction are performed in parallel, such that the time is saved, and the efficiency is improved. In addition, the resource demands for parallel processes of registration and iterative reconstruction are met.

Figure 3:
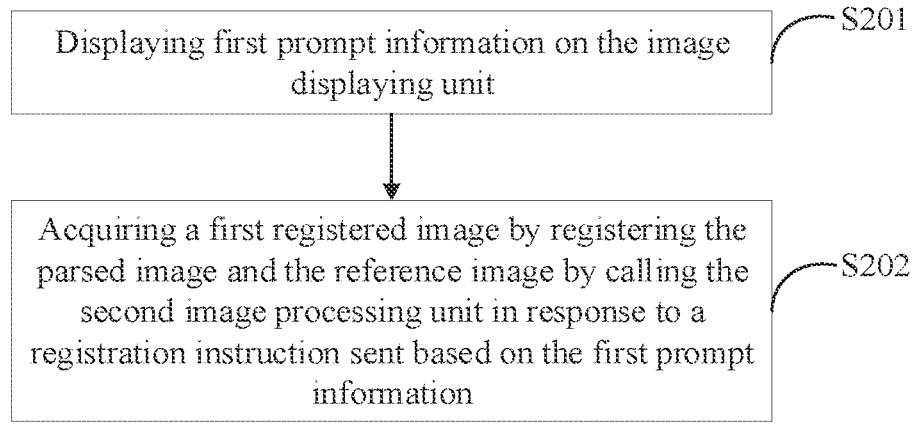
FIG. 3 is a flow chart of sub-steps of a method for processing images according to some embodiments of the present disclosure.

In view of the fact that in the processes of reconstruction and registration, the user fails to know or control the progress of processing as required, in order to meet the demands of the user and improve the experience of the user, in the embodiments of the present disclosure, referring to FIG. 3, the step of acquiring, by the device 100 for processing the images, the first registered image by registering the parsed image and the reference image by calling the second image processing unit includes S201 to S202.

In S201, first prompt information is displayed on an image displaying unit.

The first prompt information includes a parsing reconstruction completion prompt and/or a first registration prompt.

In S202, a first registered image is acquired by registering the parsed image and the reference image by calling the second image processing unit in response to a registration instruction sent based on the first prompt information.

In the embodiments of the present disclosure, referring to FIG. 1, the device 100 for processing the images displays the first prompt information on the image displaying unit 40 upon detecting that the first image processing unit performs parsing reconstruction on the projection data.

In some embodiments, the first prompt information includes only the parsing reconstruction completion prompt, only the first registration prompt, or both the parsing reconstruction completion prompt and the first registration prompt. Furthermore, in the case that the first prompt information is displayed on the image displaying unit 40, the user determines, based on the first prompt information, that parsing reconstruction is completed and the process of registration is started.

In some embodiments, the parsing reconstruction completion prompt is a prompt for the selection of performing registration or abandoning registration after parsing reconstruction is completed, and the first registration prompt is a prompt for the selection of performing registration or abandoning registration. In the case that the user needs to perform registration, the user selects the prompt for performing registration on the image displaying unit 40, and then a registration instruction is sent to the device 100 for processing the images. In this case, the device 100 for processing the images registers the parsed image and the reference image by calling the second image processing unit in response to the registration instruction sent by the user.

It can be understood that, in the case that the user does not need to perform registration, the user selects the prompt for abandoning registration on the image displaying unit 100, and an instruction of abandoning registration is sent to the device 100 for processing the images. In this case, the device 100 for processing the images does not register the parsed image and the reference image in response to the instruction of abandoning registration sent by the user.

In some embodiments, the first prompt information includes a registration prompt for automatic registration and a registration prompt for manual registration. In the case that the user needs to perform automatic registration, the user selects the registration prompt for automatic registration on the image displaying unit 40, and then an instruction of automatic registration is sent to the device 100 for processing the images. In this case, the device 100 for processing the images automatically registers the parsed image by calling the second image processing unit in response to the instruction of automatic registration sent by the user. In the case that the user needs to perform manual registration, the user selects the registration prompt for manual registration on the image displaying unit 40, and then an instruction of manual registration is sent to the device 100 for processing the images. In this case, the device 100 for processing the images enters, in response to the instruction of manual registration sent by the user, the process of manual registration to manually register the iterated image.

In manual registration, the device 100 for processing the images displays the parsed image on the image displaying unit 40, and the user manually drags the parsed image to determine a component of the parsed image in a target direction. Then, the device 100 for processing the images registers the component of the parsed image and the component of the reference image in the target direction by the second image processing unit.

In the method for processing the images according to the embodiments of the present disclosure, the problem that a user interface fails to satisfy workflow interaction is solved by displaying the first prompt information on the image displaying unit 40 and registering the parsed image by calling the second image processing unit in response to the registration instruction sent based on the registration prompt to. Meanwhile, different requirements of the user are satisfied, and the user experience is greatly improved.

In some embodiments, after the device 100 for processing the images acquires the first registered image by registering the parsed image and the reference image by calling the second image processing unit, the method for processing the images according to the embodiments of the present, disclosure further includes:

displaying the first registered image on the image displaying unit 40.

The second image processing unit displays the first registered image, acquired by registration, on the image displaying unit 40 upon completing registration of the parsed image and the reference image, such that the waiting time of the user is saved. Meanwhile, the device 100 for processing the images acquires a second registered image by registering at least two of the iterated image, the parsed image, and the reference image by calling the second image processing unit. In this way, the iterated image is registered while the registered image is displayed, such that the waiting time of the user is further saved, and the work efficiency is further improved.

It can be understood that, after the second image processing unit completes registration of the parsed image and the reference image, the iterated image is acquired by waiting for the competition of iterative reconstruction on the first image processing unit in the case that the process of iterative reconstruction is not completed by the first image processing unit. Then, the device 100 for processing the images acquires the second registered image by registering at least two of the iterated image, the parsed image, and the reference image by calling the second image processing unit, and displays the second registered image on the image displaying unit 40.

Figure 4:
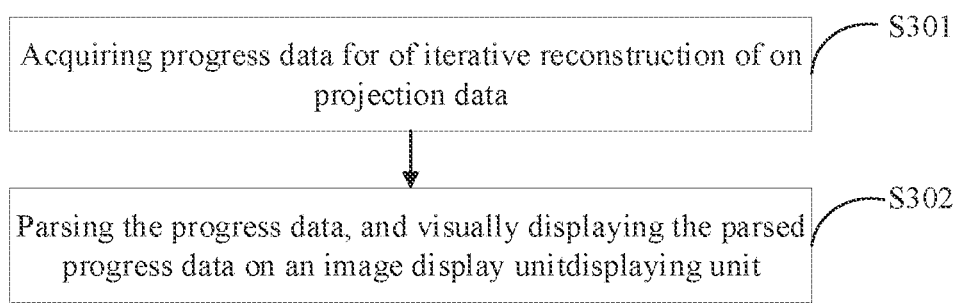
FIG. 4 is a flow chart of sub-steps of a method for processing images according to some embodiments of the present disclosure.

In order to further improve the convenience of use, in the embodiments of the present disclosure, referring to FIG. 4, after the device 100 for processing the images performs iterative reconstruction on the projection data by calling the first image processing unit, the method for processing the images according to the embodiments of the present disclosure also includes S301 to S302.

In S301, progress data of iterative reconstruction on the projection data is acquired.

In S302, the progress data is parsed, and parsed progress data is displayed on the image displaying unit.

In the case that the first image processing unit performs iterative reconstruction on the projection data of the object to be detected, the progress data of iterative reconstruction is acquired and then parsed, and the parsed progress data is visually displayed on the image displaying unit 40.

In some embodiments, the device 100 for processing the images visually displays the parsed progress data on the image displaying unit 40 in the form of a progress bar, a numerical value, which is set according actual needs and is not limited in the embodiments of the present disclosure.

In the method for processing the images according to the embodiments of the present disclosure, in the case that the first image processing unit performs iterative reconstruction on the projection data of the object to be detected, by displaying the progress of iterative reconstruction, the user conveniently learns about the progress of iterative reconstruction and controls the process of image processing according to the progress.

It can be understood that, the device 100 for processing the images further displays prompts such as ending iterative reconstruction, suspending iterative reconstruction, and continuing iterative reconstruction on the image displaying unit 40 while displaying the process of iterative reconstruction. In the case that the user does not need the iterated image acquired by iterative reconstruction, the user selects the prompt of ending iterative reconstruction, In this case, the device 100 for processing the images ends iterative reconstruction in response to the prompt of ending iterative reconstruction. In the case that the user needs to suspend iterative reconstruction, the user selects the prompt of suspending iterative reconstruction. In this case, the device 100 for processing the images suspends the progress of iterative reconstruction in response to the prompt of suspending iterative reconstruction. In the case that the user needs to continue iterative reconstruction after suspending iterative reconstruction, the user selects the prompt of continuing iterative reconstruction. In this case, the device 100 for processing the images continuously performs iterative reconstruction in response to the prompt of continuing iterative reconstruction.

For a more accurate registration result, after the device 100 for processing the images acquires the iterated image by performing iterative reconstruction on the projection data by calling the first image processing unit, the method for processing the images according to the embodiments of the present disclosure further includes:

acquiring a second registered image by registering at least two of the iterated image, the parsed image, and the reference image by calling the second image processing unit.

Figure 5:
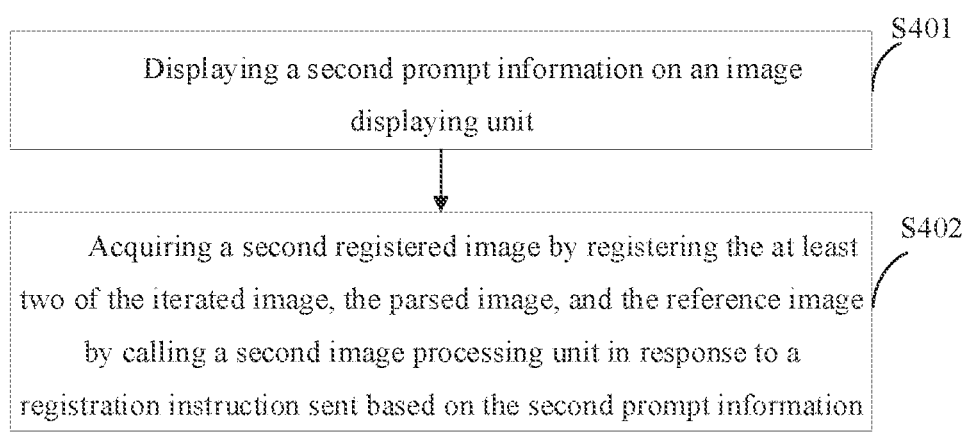
FIG. 5 is a flow chart of sub-steps of a method for processing images according to some embodiments of the present disclosure.

In some embodiments, referring to FIG. 5, the step of acquiring, by the device 100 for processing the images, the second registered image by registering at least two of the iterated image, the parsed image, and the reference image by calling the second image processing unit includes S401 to S402.

In S401, a second prompt information is displayed on an image displaying unit.

The second prompt information includes an iterative reconstruction completion prompt and/or a second registration prompt.

In S402, the second registered image is acquired by registering the at least two of the iterated image, the parsed image, and the reference image by calling the second image processing unit in response to a registration instruction sent based on the second prompt information.

In response to acquiring the iterated image, the device 100 for processing the images sends the iterated image to the second image processing unit, so as to registering at least two of the iterated image, the parsed image, and the reference image by calling the second image processing unit.

It can be understood that, the second image processing unit registers any two or all of the iterated image, the parsed image, and the reference image, which is set according to actual use demands and is not specifically limited in the embodiments of the present disclosure.

In the embodiments of the present disclosure, in the case that the device 100 for processing the images registers at least two of the iterated image, the parsed image, and the reference image by calling the second image processing unit, the registration method is the same as that of registering the parsed image and the reference image, which is not repeated herein as a reference may be made to the process of registering the parsed image.

In order to facilitate user operations, meet various needs of the user, and improve the diversity of selections, in the embodiments of the present disclosure, the device 100 for processing the images also displays a second prompt information on the image displaying unit 40 in response to acquiring the iterated image by performing iterative reconstruction on the projection data by calling the first image processing unit.

In the embodiments of the present disclosure, the second prompt information includes only the iterative reconstruction completion prompt, only the second registration prompt, or both the iterative reconstruction completion prompt and the second registration prompt.

In the case that the second prompt information is displayed on the image displaying unit 40, the user acquires, based on the second prompt information, the information that iterative reconstruction is completed and the process of registration is started.

The iterative reconstruction completion prompt is a selection prompt for prompting the user that iterative reconstruction is completed and registration needs to be performed or abandoned. The second registration prompt is a selection prompt for prompting the user that the process of registering the iterated image is started, and registration is performed or abandoned.

In the case that the user needs to register the iterated image, the user selects the prompt for performing registration on the image displaying unit 40, and then a registration instruction is sent to the device 100 for processing the images. In this case, the device 100 for processing the images registers the iterated image and the reference image by calling the second image processing unit in response to the registration instruction sent by the user.

It can be understood that, in the case that the user does not need to register the iterated image, the user selects the prompt for abandoning registration on the image displaying unit 40, and then an instruction of abandoning registration is sent to the device for processing the images. In this case, the device 100 for processing the images does not register the parsed image and the reference image in response to the instruction of abandoning registration sent by the user.

In some embodiments, the second prompt information is a registration prompt for registering the iterated image and the parsed image, registering the iterated image and the reference image, and registering the iterated image, the parsed image, and the reference image. Based on the registration manner selected by the user, the second image processing unit is called to register the corresponding images. In this way, the iterated image is registered with different images according to actual needs.

In some embodiments, the second prompt information includes a registration prompt for automatic registration and a registration prompt for manual registration. In the case that the user needs to perform automatic registration, the user selects the registration prompt for automatic registration on the image displaying unit 40, and then an instruction of automatic registration is sent to the device 100 for processing the images. In this case, the device 100 for processing the images automatically registers the iterated image by calling the second image processing unit in response to the instruction of automatic registration sent by the user. In the case that the user needs to perform manual registration, the user selects the registration prompt for manual registration on the image displaying unit 40, and then an instruction of manual registration is sent to the device 100 for processing the images. In this case, the device 100 for processing the images enters, in response to the instruction of manual registration sent by the user, the process of manual registration to manually register the iterated image.

As the iterated image is of greater quality, in the method for processing the images according to the embodiments of the present disclosure, a more accurate registration result is acquired after the iterated image is registered. In addition, in the method for processing the images according to the embodiments of the present disclosure, the problem that a user interface fails to satisfy workflow interaction is solved by displaying the second prompt information on the image displaying unit 40 and registering the iterated image by calling the second image processing unit in response to the registration instruction sent based on the second prompt information. Meanwhile, different requirements of the user are satisfied, and the user experience is greatly improved.

In order to improve the convenience of user operations and simplify the operations, in response to acquiring the iterated image by performing iterative reconstruction on the projection data of the object to be detected by calling the first image processing unit, the method for processing the images according to the embodiments of the present disclosure further includes:

displaying at least two of the parsed image, the iterated image, and the reference image on the image displaying unit 40 in an overlaid fashion; or displaying the second registered image on the image displaying unit 40.

In the process of iterative reconstruction, the second image processing unit simultaneously registers the parsed image and the reference image, such that in response to acquiring the iterated image, the device 100 for processing images only calls the second image processing unit to register the iterated image and the reference image and to register the iterated image and the parsed image.

After the second image processing unit completes registration of the parsed image and the reference image, registration of the iterated image and the reference image, and registration of the iterated image and the parsed image, that is, upon completing registration of any two images, the device 100 for processing the images displays a registration result of the parsed image and the reference image, a registration result of the iterated image and the reference image, and a registration result of the iterated image and the parsed image.

In some embodiments, the parsed image, the iterated image, and the reference image are displayed in pairs in an overlaid fashion, that is, the registration result of the iterated image, the parsed image, and the reference image is displayed. In some embodiments, the parsed image, the iterated image, and the reference image are displayed together in an overlaid fashion, which is set according to actual needs.

After at least two of the parsed image, the iterated image, and the reference image are displayed in an overlaid fashion, the user acquires the corresponding registration results by selectively viewing one or more of the results of overlaid display.

In order to improve the user experience and the interactivity of the device, in the embodiments of the present disclosure, in response to acquiring the iterated image, the device 100 for processing the images also displays the iterated image, the parsed image, and the reference image on the image displaying unit 40, and the user acquires the second registered image by registering any two or more of the images displayed on the image displaying unit 40.

Upon selecting an image to be registered, the user sends, by the image displaying unit 40, a registration request to the device 100 for processing the images. The registration request includes the image to be registered that is selected by the user, Upon receiving the registration request, the device 100 for processing the images registers, in response to the registration request, the image to be registered that is selected by the user, and displays, upon registration, the second registered image on the image displaying unit 40 in an overlaid fashion to facilitate viewing by the user, such that the interactivity of the device is improved.

Figure 6:
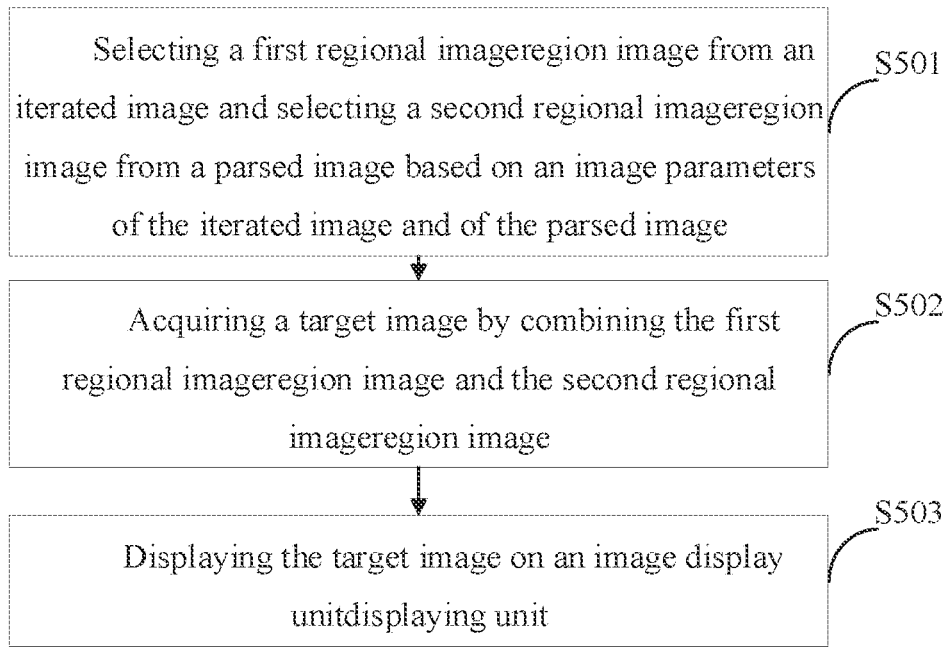
FIG. 6 is a flow chart of sub-steps of a method for processing images according to some embodiments of the present disclosure.

In order to further improve the quality of the images, referring to FIG. 6, after the device 100 for processing the images acquires the iterated image by performing iterative reconstruction on the projection data of the object to be detected by calling the first image processing unit, the method for processing the images according to the embodiments of the present disclosure also includes S501 to S503.

In S501, a first region image is selected from the iterated image and a second region image is selected from the parsed image based on image parameters of the iterated image and the parsed image.

In S502, a target image is acquired by combining the first region image and the second region image.

In S503, the target image is displayed on the image displaying unit.

The image parameters include a signal-to-noise ratio of the image, a contrast ratio of the image, a spatial resolution of the image, and the like. For the iterated image and the parsed image, the signal-to-noise ratio and the contrast ratio of the iterated image are greater, and the spatial resolution of the parsed image is greater. Thus, in the embodiments of the present disclosure, dominant regions in the iterated image and the parsed image are acquired by analyzing the spatial resolutions, the signal-to-noise ratios, and the contrast ratios of the iterated image and the parsed image. For example, for the iterated image, a region with a greater contrast ratio is acquired, and for the parsed image, a region with a greater spatial resolution is acquired.

Accordingly, in the embodiments of the present disclosure, the device 100 for processing the images analyzes the iterated image and the parsed image based on the image parameters of the iterated image and the parsed image, and selects the first region image from the iterated image and selects the second region image from the parsed image. The first region image is an image of the dominant region in the iterated image, and the second region image is an image of the dominant region in the parsed image.

In some embodiments, in the case that the device 100 for processing the images analyzes the iterated image and the parsed image based on the image parameters of the iterated image and the parsed image, the device 100 for processing the images analyzes the iterated image and the parsed image pixel by pixel, that is, the image parameters such as contrast ratio, signal-to-noise ratio, and spatial resolution of each pixel in the iterated image and the parsed image. The device 100 for processing the images also divides the iterated image and the parsed image, and analyzes the image parameters by the regions, so as to acquire the dominant regions in the iterated image and the parsed image.

In response to selecting the first region image from the iterated image and selecting the second region image from the parsed image, the device 100 for processing the images acquires a target image by combining the first region image and the second region image.

It should be noted that in the embodiments of the present disclosure, the target image is an image of the same size as the iterated image and the parsed image. In the case that the first region image selected from the iterated image by the device 100 for processing the images, and the second region image selected from the parsed image by the device 100 for processing the images fail to combine to an image of the same size as the parsed image and the iterated image, the remaining region of the parsed image or the iterated image is determined as a target region image. Then, the target image is acquired by combining the first region image, the second region image, and the target region image. In this way, the size of the target image is the same as the parsed image and the iterated image.

In some embodiments, in order to ensure the smoothness of the target image acquired by combination, in the embodiments of the present disclosure, in the case that the device 100 for processing the images combines the first region image and the second region image, different weights are set to pixel values at edge portions of the first region image and the second region image for smoothness. In this way, in the case that the first region image and the second region image are combined, the combined portions of the first region image and the second region image are in smooth transition to ensure the smoothness of the target image acquired by combination. In some embodiments, the weights are set to the pixel values of the edge portions of the first region image and the second region image according to actual needs, which is not specifically limited in the embodiments of the present disclosure.

In response to acquiring the target image, the device 100 for processing the image displays the target image on the image displaying unit 40 for the convenience of the reference of the user.

In order to improve the interactivity of the devices and improve the user experience, after the device 100 for processing the images acquires the target image, the method for processing the images according to the embodiments of the present disclosure further includes:

displaying at least of the target image, the parsed image, the iterated image, and the reference image on the image displaying unit in an overlaid fashion; or displaying, in response to a registration request for an image, an image to he registered in the registration request on the image displaying unit 40 in an overlaid fashion. The image to be registered includes at least two of the parsed image, the iterated image, the reference image, and the target image.

In response to acquiring the target image, the device 100 for processing the images calls the second image processing unit to register the target image and the reference image, register the target image and the iterated image, and register the target image and the parsed image.

In response to completing registration of all images by calling the second image processing unit, the device 100 for processing the image displays the registration results of all images on the image displaying unit 40. The registration results include the registration results of all the images, such as the registration result of the iterated image and the reference image, the registration result of the iterated image and the parsed image, the registration result of the parsed image and the reference image, the registration result of the target image and the reference image, the registration result of the target image and the iterated image, and the registration result of the target image and the parsed image. That is, the parsed image, the iterated image, the target image, and the reference image are displayed in pairs in an overlaid fashion.

In some embodiments, every three of the parsed image, the iterated image, the target image, and the reference image are displayed in an overlaid fashion. In some embodiments, the parsed image, the iterated image, the target image, and the reference image are displayed together, which is set according to actual demands and is not specifically limited in the embodiments of the present disclosure.

In order to improve the user experience and the interactivity of the device, in the embodiments of the present disclosure, in response to acquiring the target image, the device 100 for processing the images also displays the iterated image, the parsed image, the target image, and the reference image on the image displaying unit 40. The user selectively registers any two or more of the images displayed on the image displaying unit 40. Upon selecting an image to be registered, the user sends, by the image displaying unit 40, a registration request to the device 100 for processing the images. The registration request includes the image to be registered that is selected by the user.

Upon receiving the registration request, the device 100 for processing the images registers, in response to the registration request, the image to be registered that is selected by the user, and displays, upon registration, the registered image on the image displaying unit 40 in an overlaid fashion to facilitate viewing by the user, such that the interactivity of the device is improved.

In the method for processing the images according to the embodiments of the present disclosure, after projection data of the object to be detected is acquired, the parsed image is acquired by performing parsing reconstruction on the projection data of the object to be detected by calling the first image processing unit. Then, the iterated image is acquired by registering the parsed image and the reference image by calling the second image processing unit, and by performing iterative reconstruction on the projection data of the object to be detected by calling the first image processing unit. In this way, by providing the first image processing unit and the second image processing unit, iterative reconstruction on the projection data by the first image processing unit and registration on the parsed image and the reference image by the second image processing unit are performed in parallel upon parsing reconstruction, that is, the process of registration and the process of iterative reconstruction are performed in parallel, such that the time is saved, and the efficiency is improved.

In the method for processing the images according to the embodiments of the present disclosure, by providing the first image processing unit and the second image processing unit, the resource demands for parallel implementation of registration and iterative reconstruction are met, and the problem of mutual impact caused by parallel implementation of registration and iterative reconstruction is solved.

In the method for processing the images according to the embodiments of the present disclosure, by displaying the progress of reconstruction and registration, the interactivity of the device is improved, and the interaction problem of the device interface regarding the reconstruction and registration workflow is solved.

Figure 7:
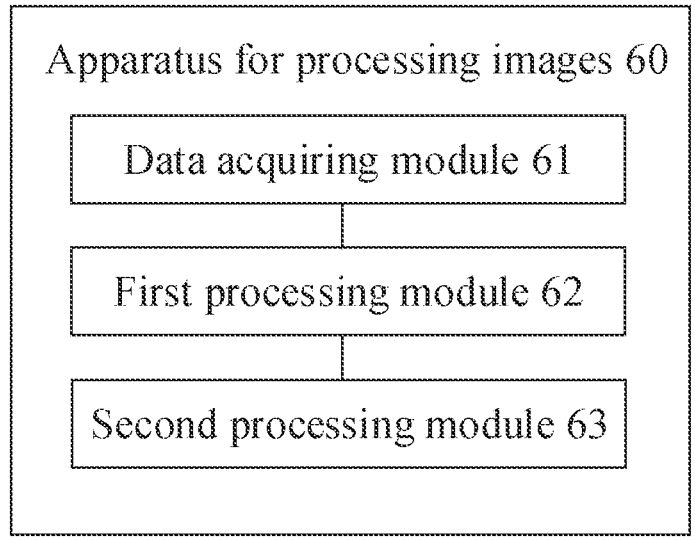
FIG. 7 is a schematic block diagram of an apparatus for processing images according to some embodiments of the present disclosure.

Based on the same inventive concept, referring to FIG. 7, the embodiments of the present disclosure further provide an apparatus 60 for processing the images, which is applicable to the device 100 for processing the images shown in FIG. 1. In the embodiments of the present disclosure, the apparatus 60 for processing the images includes one or more software function modules stored in the memory 10 of the device 100 for processing the images. As shown in FIG. 7, the apparatus 60 for processing the images according to the embodiments of the present disclosure includes a data acquiring module 61, a first processing module 62, and a second processing module 63.

The data acquiring module 61 is configured to acquire projection data of an object to be detected.

The first processing module 62 is configured to acquire a parsed image by performing parsing reconstruction on the projection data by calling a first image processing unit.

The second processing module 63 is configured to acquire a first registered image by registering the parsed image and a reference image by calling a second image processing unit, and acquire an iterated image by performing iterative reconstruction on the projection data by calling the first image processing unit.

The iterative reconstruction of the projection data by the first image processing unit and the registration of the parsed image and the reference image by the secondary image processing unit are performed in parallel. That is, the process of iterative reconstruction and the process of registration are performed in parallel.

In some embodiments, the device 100 for processing the images further includes an image displaying unit 40, and the second processing module 63 is configured to:
  display first prompt information on the image displaying unit 40, wherein the first prompt information includes a parsing reconstruction completion prompt and/or a first registration prompt; and
  acquire a first registered image by registering the parsed image and the reference image by calling the second image processing unit in response to a registration instruction sent based on the first prompt information.

In some embodiments, upon acquiring the first registered image by registering the parsed image and the reference image by calling the second image processing unit, the second processing module 63 is further configured to:
  display the first registered image on the image displaying unit 40.

In some embodiments, the device for processing the images further includes an image displaying unit 40, and upon performing iterative reconstruction on the projection data by calling the first image processing unit, the second processing module 63 is further configured to:
  acquire progress data of iterative reconstruction on the projection data; and
  parse the progress data, and visually display parsed progress data on the image displaying unit 40.

In some embodiments, the device for processing the images further includes an image displaying unit 40, and upon acquiring the iterated image by performing iterative reconstruction on the projection data by calling the first image processing unit, the second processing module 63 is further configured to:
  acquire a second registered image by registering at least two of the iterated image, the parsed image, and the reference image by calling the second image processing unit.

In some embodiments, the second processing module 63 is configured to:
  display a second prompt information on the image displaying unit, wherein the second prompt information includes art iterative reconstruction completion prompt and/or a second registration prompt; and
  acquire a second registered image by registering the at least two of the iterated image, the parsed image, and the reference image by calling the second image processing unit in response to a registration instruction sent based on the second prompt information.

In some embodiments, the device for processing the images further includes an image displaying unit 40, and upon acquiring the iterated image by performing iterative reconstruction on the projection data by calling the first image processing unit, the second processing module 63 is further configured to:
  display the second registered image on the image displaying unit 40.

In some embodiments, the device for processing the images further includes an image displaying unit 40, and upon acquiring the iterated image by performing iterative reconstruction on the projection data by calling the first image processing unit, the second processing module 63 is further configured to:

select a first region image from the iterated image and a second region image from the parsed image based on image parameters of the iterated image and the parsed image;

acquire a target image by combining the first region image and the second region image; and display the target image on the image displaying unit 40.

In some embodiments, upon acquiring the target image by combining the first region image and the second region image, the second processing module 63 is further configured to:

display at least two of the target image, the parsed image, the iterated image, and the reference image on the image displaying unit 40 in an overlaid fashion; or display, in response to a registration request for an image, an image to be registered in the registration request on the image displaying unit 40 in an overlaid fashion. The image to be registered includes at least two of the parsed, the iterated image, the reference image, and the target image.

In the apparatus for processing the images according to the embodiments of the present disclosure, after the projection data of the object to be detected is acquired, the parsed image is acquired by performing parsing reconstruction on the projection data of the object to be detected by calling the first image processing unit. Then, the iterated image is acquired by registering the parsed image and the reference image by calling the second image processing unit, and by performing iterative reconstruction on the projection data of the object to be detected by calling the first image processing unit. In this way, by providing the first image processing unit and the second image processing unit, the image acquired by parsing reconstruction is registered and iterative reconstruction is continued after parsing reconstruction, such that the process of registration and the process of iterative reconstruction are performed in parallel, such that the time is saved, and the efficiency is improved.

In addition, by providing the first image processing unit and the second image processing unit, the resource demands for parallel implementation of registration and iterative reconstruction are met, and the problem of mutual impact caused by parallel implementation of registration and iterative reconstruction is solved. By displaying the progress of reconstruction and registration, the interactivity of the device is improved, and the interaction problem of the device interface regarding the reconstruction and registration workflow is solved.

It is clear to those skilled in the art that, for the convenience and brevity of description, a reference may be made to the corresponding processes in the above method embodiments for the specific processes of the described apparatus, which is not repeated herein.

Accordingly, the embodiments of the present disclosure further provide a non-transitory computer-readable storage medium. The readable storage medium stores one or more computer programs, wherein the one or more computer programs, when loaded and run, cause an electronic device of the readable storage medium to perform the method for processing the images according to any one of the above embodiments.

The readable storage medium is, but is not limited to, various medium capable of storing program codes, such as a USE flash drive, a mobile hard disk, a read-only memory (ROW a random-access memory (RAM), a magnetic disk, an optical disk, or the like.

It is clear to those skilled in the art that, for the convenience and brevity of description, a reference may he made to the corresponding processes in above method embodiments for the specific process of the readable storage medium, which is not repeated herein.

In summary, in the method, apparatus, and device for processing the images according to the embodiments of the present disclosure, after the projection data of the object to be detected is acquired, the parsed image is acquired by performing parsing reconstruction on the projection data of the object to be detected by calling the first image processing unit. Then, the iterated image is acquired by registering the parsed image and a reference image by calling the second image processing unit, and by performing iterative reconstruction on the projection data of the object to be detected by calling the first image processing unit. In this way, by providing the first image processing unit and the second image processing unit, the iterative reconstruction on the projection data by the first image processing unit and the registration on the parsed image and the reference image by the second image processing unit are performed in parallel after parsing reconstruction, that is, the process of registration and the process of iterative reconstruction are performed in parallel, such that the time is saved, and the efficiency is improved.

The method, apparatus and device according to the embodiments of the present disclosure are described in detail above. The principles and implementations of the present disclosure are described herein based on specific examples. The descriptions of the above embodiments are only used to help understand the technical solutions and the core ideas of the present disclosure. Those of ordinary skill in the art shall appreciate that they can still modify the technical solutions described in the above embodiments, or make equivalent substitutions for some of the technical features. These modifications or substitutions do not deviate the nature of the corresponding technical solutions from the scope of the technical solutions of the embodiments of the present disclosure.

What is claimed is:

1. A method for processing images, applicable to a device for processing images comprising a first image processing unit and a second image processing unit, the method comprising:

acquiring projection data of an object to be detected;

acquiring, by the first image processing unit, a parsed image by performing parsing reconstruction on the projection data; and acquiring, by the second image processing unit, a first registered image by registering the parsed image and a reference image, and acquiring, by the first image processing unit, an iterated image by performing iterative reconstruction on the projection data;

wherein a process of iterative reconstruction and a process of registration are performed in parallel, wherein the device for processing the images further comprises an image displaying unit, and upon acquiring, by the second image processing unit, the first registered image by registering the parsed image and the reference image, the method further comprises:

displaying the first registered image on the image displaying unit.

2. The method according to claim 1, wherein the device for processing the images further comprises an image displaying unit, and acquiring, by the second image processing unit, the first registered image by registering the parsed image and the reference image comprises:

displaying first prompt information on the image displaying unit, wherein the first prompt information comprises a parsing reconstruction completion prompt and/or a first registration prompt; and acquiring, by the second image processing unit, the first registered image by registering the parsed image and the reference image in response to a registration instruction sent based on the first prompt information.

3. The method according to claim 1, wherein the device for processing the images further comprises an image displaying unit, and upon performing iterative reconstruction on the projection data, the method further comprises:

acquiring progress data of iterative reconstruction on the projection data; and parsing the progress data, and visually displaying parsed progress data on the image displaying unit.

4. The method according to claim 1, wherein upon acquiring, by the first image processing unit, the iterated image by performing iterative reconstruction on the projection data, the method further comprises:

acquiring, by the second image processing unit, a second registered image by registering at least two of the iterated image, the parsed image, and the reference image.

5. The method according to claim 4, wherein the device for processing the images further comprises an image displaying unit, and acquiring, by the second image processing unit, the second registered image by registering at least two of the iterated image, the parsed image, and the reference image comprises:

displaying a second prompt information on the image displaying unit, wherein the second prompt information comprises an iterative reconstruction completion prompt and/or a second registration prompt; and acquiring, by the second image processing unit, the second registered image by registering the at least two of the iterated image, the parsed image, and the reference image in response to a registration instruction sent based on the second prompt information.

6. The method according to claim 4, wherein the device for processing the images further comprises an image displaying unit, and upon acquiring, by the first image processing unit, the iterated image by performing iterative reconstruction on the projection data, the method further comprises:

displaying the second registered image on the image displaying unit.

7. The method according to claim 1, wherein the device for processing the images further comprises an image displaying unit, and upon acquiring, by the first image processing unit, the iterated image by performing iterative reconstruction on the projection data, the method further comprises:

selecting a first region image from the iterated image and a second region image from the parsed image based on image parameters of the iterated image and the parsed image;

acquiring a target image by combining the first region image and the second region image; and displaying the target image on the image displaying unit.

8. The method according to claim 7, wherein upon acquiring the target image by combining the first region image and the second region image, the method further comprises:

displaying at least two of the target image, the parsed image, the iterated image, and the reference image on the image displaying unit in an overlaid fashion.

9. An apparatus for processing images, applicable to a device for processing images comprising a first image processing unit and a second image processing unit, and the apparatus comprising: a processor, a memory, and one or more computer programs stored on the memory and runnable on the processor, wherein the one or more computer programs, when loaded and run by the processor, cause the processor to perform:

acquiring projection data of an object to be detected;

acquiring, by the first image processing unit, a parsed image by performing parsing reconstruction on the projection data; and acquiring, by the second image processing unit, a first registered image by registering the parsed image and a reference image, and acquiring an iterated image by performing iterative reconstruction on the projection data;

wherein a process of iterative reconstruction and a process of registration are performed in parallel, wherein the device for processing the images further comprises an image displaying unit, and upon acquiring, by the second image processing unit, the first registered image by registering the parsed image and the reference image, the one or more computer programs further cause the processor to perform:

displaying the first registered image on the image displaying unit.

10. The apparatus according to claim 9, wherein the device for processing the images further comprises an image displaying unit, and acquiring, by the second image processing unit, the first registered image by registering the parsed image and the reference image comprises:

displaying first prompt information on the image displaying unit, wherein the first prompt information comprises a parsing reconstruction completion prompt and/or a first registration prompt; and acquiring, by the second image processing unit, the first registered image by registering the parsed image and the reference image in response to a registration instruction sent based on the first prompt information.

11. The apparatus according to claim 9, wherein the device for processing the images further comprises an image displaying unit, and upon performing parsing reconstruction on the projection data, the one or more computer programs further cause the processor to perform:

acquiring progress data of iterative reconstruction on the projection data; and parsing the progress data, and visually display parsed progress data on the image displaying unit.

12. The apparatus according to claim 9, wherein upon acquiring, by the first image processing unit, the iterated image by performing iterative reconstruction on the projection data, the one or more computer programs further cause the processor to perform:

acquiring, by the second image processing unit, a second registered image by registering at least two of the iterated image, the parsed image, and the reference image.

13. The apparatus according to claim 12, wherein the device for processing the images further comprises an image displaying unit, and acquiring, by the second image processing unit, the second registered image by registering at least two of the iterated image, the parsed image, and the reference image comprises:

displaying a second prompt information on the image displaying unit, wherein the second prompt information comprises an iterative reconstruction completion prompt and/or a second registration prompt; and acquiring, by the second image processing unit, the second registered image by registering the at least two of the iterated image, the parsed image, and the reference image in response to a registration instruction sent based on the second prompt information.

14. The apparatus according to claim 12, wherein the device for processing the images further comprises an image displaying unit, and upon acquiring, by the first image processing unit, the iterated image by performing iterative reconstruction on the projection data, the one or more computer programs further cause the processor to perform:

displaying the second registered image on the image displaying unit.

15. The apparatus according to claim 9, wherein the device for processing the images further comprises an image displaying unit, and upon acquiring, by the first image processing unit, the iterated image by performing iterative reconstruction on the projection data, the one or more computer programs further cause the processor to perform:

selecting a first region image from the iterated image and a second region image from the parsed image based on image parameters of the iterated image and the parsed image;

acquiring a target image by combining the first region image and the second region image; and displaying the target image on the image displaying unit.

16. The apparatus according to claim 15, wherein upon acquiring the target image by combining the first region image and the second region image, the one or more computer programs further cause the processor to perform:

displaying at least two of the target image, the parsed image, the iterated image, and the reference image on the image displaying unit in an overlaid fashion.

17. A device for processing images, comprising a first image processing unit, a second image processing unit, a memory, a processor, and one or more computer programs stored on the memory and runnable on the processor, wherein the processor, when loading and executing the one or more computer programs, is caused to perform the following by calling the first image processing unit and the second image processing unit:

acquiring projection data of an object to be detected;

acquiring, by the first image processing unit, a parsed image by performing parsing reconstruction on the projection data; and acquiring, by the second image processing unit, a first registered image by registering the parsed image and a reference image, and acquiring, by the first image processing unit, an iterated image by performing iterative reconstruction on the projection data;

wherein a process of iterative reconstruction and a process of registration are performed in parallel, wherein the device for processing the images further comprises an image displaying unit, and upon acquiring, by the second image processing unit, the first registered image by registering the parsed image and the reference image, the processor, when loading and executing the one or more computer programs, is caused to further perform:

displaying the first registered image on the image displaying unit.

18. A non-transitory computer-readable storage medium, comprising one or more computer programs, wherein the one or more computer programs, when loaded and run, cause an electronic device of the readable storage medium to perform the method for processing the images as defined in claim 1.

\* \* \* \* \*